Figure 1:
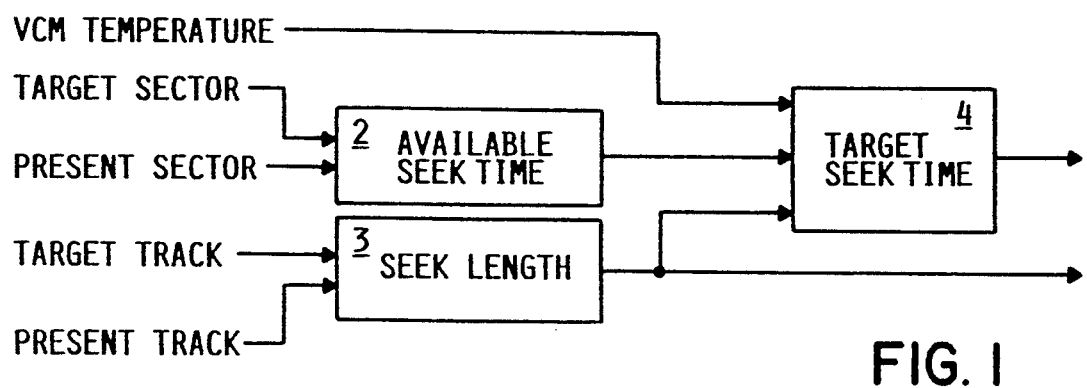

United States Patent [19]

Wallis

[11] Patent Number: 5,268,804
[45] Date of Patent: Dec. 7, 1993

[54] ACTUATOR ARM CONTROLLER FOR A STORAGE DEVICE

[75] Inventor: Christopher N. Wallis, Winchester, England

[73] Assignee: International Business Machines Corporation, Armonk, N.Y.

[21] Appl. No.: 971,696

[22] Filed: Nov. 4, 1992

Related U.S. Application Data

[63] Continuation of Ser. No. 512,728, Apr. 23, 1990, abandoned.

[30] Foreign Application Priority Data

Apr. 26, 1989 [GB] United Kingdom ............ 89304178

[51] Int. Cl.⁵ ............................................. G11B 5/596
[52] U.S. Cl. ............................. 360/78.04; 360/78.09
[58] Field of Search ............... 360/72.1, 72.2, 73.03, 360/78.04, 78.05, 78.06, 78.08, 78.09, 78.11–78.13, 77.03; 369/32; 318/634

[56] References Cited

U.S. PATENT DOCUMENTS

| | | | |
|---|---|---|---|
| 4,149,201 | 4/1979 | Card | 360/75 |
| 4,591,933 | 5/1986 | Quackenbush | 360/78.06 |
| 4,855,978 | 8/1989 | Kanamaru | 369/32 |

FOREIGN PATENT DOCUMENTS 55-112664 8/1980 Japan.

Primary Examiner—Donald Hajec
Assistant Examiner—Won Tae C. Kim
Attorney, Agent, or Firm—Richard E. Billion; Roy W. Truelson

[57] ABSTRACT

A data storage device for use with a rotatable data storage medium having a data head and a controller for controlling movement of said data head characterized in that said controller varies the time taken for moving said data head between given positions in response to the state of said device. Particular embodiments of the invention coordinate the movement of the data head with the rotational position of the data storage medium so that the data head arrives at the desired position at the same time as the portion of the data storage medium to be accessed arrives beneath the data head. In other embodiments the time taken to move the data head between given positions is increased if the temperature of the mechanism for moving the data head exceeds a predetermined value.

18 Claims, 2 Drawing Sheets

ACTUATOR ARM CONTROLLER FOR A STORAGE DEVICE

This is a continuation application of application Ser. No. 07/512,728, filed Apr. 23, 1990, now abandoned.

This invention relates to the field of data storage devices. More particularly this invention relates to data storage devices in which the data is held on a rotatable data storage medium, the data being accessed by a data head movable between differing positions, e.g. hard or floppy discs devices, laser disc devices etc.

The data is typically organized into tracks which themselves are split into sectors. When the device receives the instruction to access a particular block of data it moves the data head to the correct radial position and then starts reading or writing as the appropriate sector passes under the data head.

It is a constant aim with such data storage devices that the time taken to access a given record be reduced to a minimum. To achieve a reduction in access time much effort is expended upon providing data storage devices in which the data head is moved between tracks in the shortest possible time.

Viewed from one aspect the present invention provides a data storage device for use with a rotatable data storage medium having a data head and a controller for controlling movement of said data head characterized in that said controller varies the time taken for moving said data head between given positions in response to the state of said device.

In the prior art the aim has been to produce the fastest possible movement between tracks to improve data access times. However, the present invention recognizes that producing the fastest possible intertrack movement on every occasion does not necessarily produce the fastest overall data access performance. The present invention provides an extra degree of freedom in the operation of the device which allows the overall performance of the device to be improved. e.g. the data access times may be reduced, more reliable operation achieved etc.

One particular problem in the prior art devices is that heat build up in the mechanism moving the data head can limit the rate at which the device may be driven. In particularly preferred embodiments of the present invention said controller is responsive to the rotational position of said rotatable data storage medium and coordinates the time taken for moving said data head between positions with the arrival of the portion of said rotatable data storage medium to be accessed at said data head.

With the prior art devices the data head was moved between positions as fast as possible even though the portion required to be accessed would not have rotated into position beneath the data head until some time after the data head had arrived at the desired position. The data head would in such circumstances have been moved more rapidly than was necessary and since increasing rate of movement results in increasing heat generation the mechanism would have been heated more than was necessary.

By coordinating the movement of the data head between positions so that it reaches the desired position only as quickly as necessary to be in place as the portion of the rotatable data storage medium to be accessed arrives at the data head then the heat build up in the mechanism moving the data head is reduced without increasing the data access time. In the prior art the data head was moved needlessly rapidly between positions and sat in place on the track to be accessed waiting for the correct portion of the rotatable data storage medium to rotate into position beneath the data head.

In preferred embodiments said controller establishes a target time for moving said data head between given positions as the time taken for said rotatable data storage medium to rotate from its sensed rotational position to the rotational position in which it is to be accessed by said data head. Such a determination provides a direct and simple method of establishing the target time for moving said data head between positions.

It will however be appreciated that the target time as determined above may be less than the minimum time in which the device is able to move said data head between those positions. To take account of this said controller increases said target time by amounts equal to the time taken for one revolution of said rotatable data storage medium until said target time is greater than the minimum possible time for moving between those positions.

The problem of heat build up in the mechanism moving the data head between positions is particularly relevant to magnetic disc data storage devices and can be acute in those in which a voice coil actuator moves said data head between positions since to reduce the response time it is desirable to reduce the mass and size of the voice coil actuator which makes it vulnerable to heat build up. The present invention is thus particularly relevant to such devices.

In the case of devices with voice coil actuators the data head may be moved between given positions by accelerating it to a fixed coasting velocity, allowing it to coast and then decelerating it so that it comes to rest at the desired position. It will be appreciated that there are many other ways in which the movement of the data head between positions is controlled. e.g. the acceleration and deceleration rates may be varied to vary the time taken to move between rest and the coast velocity. Such alternative methods of controlling the movement of the data head may be adapted to operate in accordance with the present invention whereby the time taken for movement is responsive to the state of the device. In preferred embodiments of the present invention said data head is moved between given positions by accelerating said data head to a velocity dependent upon the state of the device, allowing said data head to coast and then decelerating said data head so that said data head comes to rest at the desired position. The coast velocity may be less than in the prior art devices without increasing access time as discussed above and in such cases the heat generated in the voice coil to carry out the necessary acceleration and deceleration will be less than in the prior art fixed coast velocity type of operation.

The above has described how the present invention may be used to enhance the performance of the data storage device by coordinating the movement of the data head with the rotational position of the rotatable data storage medium so that the movement is not needlessly fast. The extra flexibility afforded by the present invention may be used in other ways.

In the prior art the design of data storage devices has involved making many worst case assumptions. One example of this has been that the devices have been designed so that they should not overheat even under the heaviest possible use. To achieve this it has been necessary to reduce the speed of movement of the data head so that the heat generated could be tolerated even under continuous use.

In particularly preferred embodiments of the present invention said controller monitors the temperature of a mechanism for moving said data head and increases the time taken to move said data head between given positions if a predetermined temperature is exceeded. By employing this feature of the present invention the data head may be moved between positions at the maximum possible rate without risk of overheating. The data head may be moved at speeds which the device could not continuously maintain and then if overheating is sensed the time for moving the data head may be increased to a slow enough value to avoid overheating.

The temperature of the mechanism for moving the data head may be monitored using a direct temperature sensor, such as a thermistor, or alternatively the temperature may be inferred from the movements of the data head which have been carried out. The later way of monitoring the temperature is particularly appropriate if a microprocessor is being used as the controller since the temperature may be inferred by calculation without the need for extra sensors, communication channels or wiring. If the temperature is inferred then a possible problem may arise if the device loses its inferred value of the temperature when it is switched off. In order to avoid any possibility of overheating the device can arranged to assume the maximum possible temperature when it is switched on. Such an assumption would detract from the initial performance of the device but this effect would only last until the usage was such that voice coil could be inferred to have cooled (typically a few minutes).

A particular embodiment of the present invention will now be described, by way of example only, with reference to the accompanying drawings in which:

FIG. 1 schematically illustrates the way in which the target time for moving between positions is established.

Figure 2:
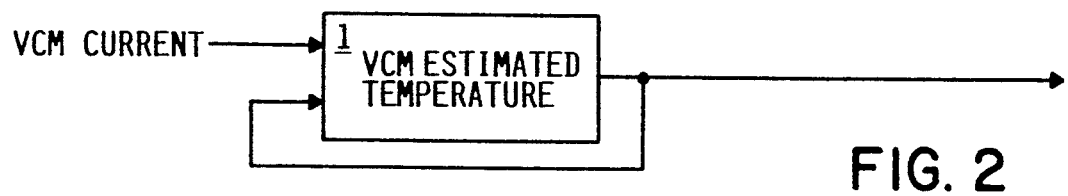

FIG. 2 schematically illustrates the way in which the temperature of the mechanism for moving the data head is monitored.

Figure 3:
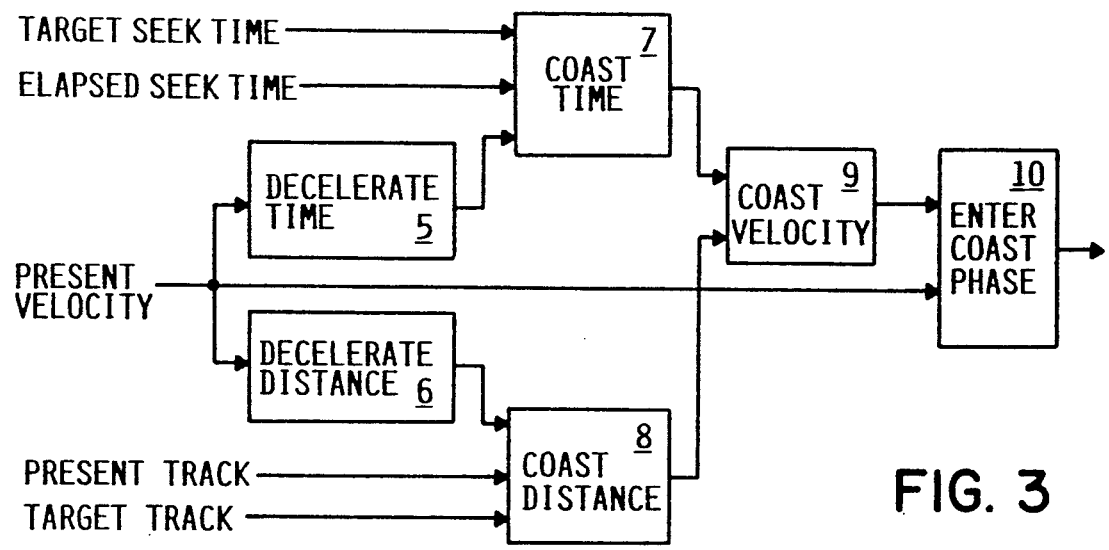

FIG. 3 schematically illustrates the way in which the control of transfer into the coast phase is carried out.

Figure 4:
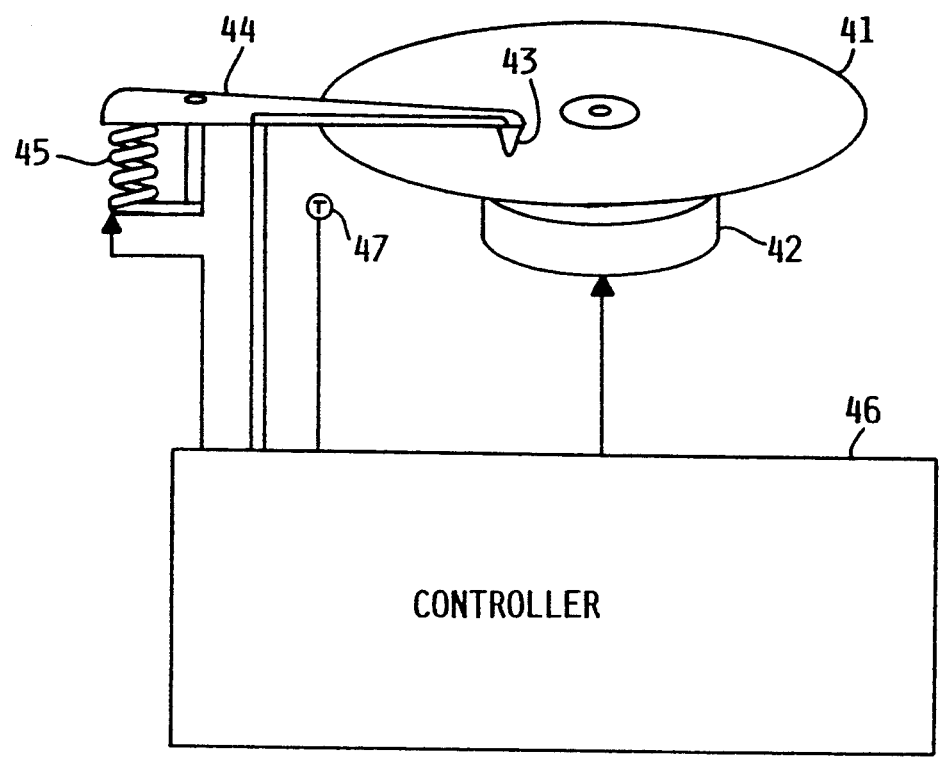

FIG. 4 shows the major hardware components of the disk drive of the present invention.

There are many possible ways in which the present invention may be implemented. e.g. a digital or analogue implementation is possible. The embodiment described below is intended for implementation in a digitally controlled disc drive. The control microprocessor present in such a disc drive can be reprogrammed to carry out the control system of the present invention in a conventional manner which need not be described in detail. Reference should be made to the seek/track follow system described in European Patent No. 13326, which although described as an analogue circuit is readily adaptable to a digital implementation.

In the Figures herein described the blocks indicate data processing functions and the lines indicate variables passed between these functions.

FIG. 1 schematically illustrates how the target time 4 for moving the data head between positions is established at the start of each seek. The information available to the controller includes the present sector and track over which the data head is positioned and the sector and track which is desired to be read. The controller is also provided with a signal indicating the voice coil motor temperature. The generation of this signal will be described further in relation to FIG. 2. The present and target sector and track signals are generated in prior art disc drives in various manners such as mechanical sensors coupled to the actuator assembly and rotation drive spindle or sensed and monitored from the signals read by the data head.

A signal commensurate with the available seek time 2 is determined by calculating the number of sectors between the present position and the target position. This may be achieved by subtracting the the present sector number from the target sector number. The sectors are numbered to increase in value in the direction of rotation and the number of sectors on each track is constant. If the result of the subtraction is negative this indicates that the data head has already passed over the target sector on that rotation and to determine the available seek time the total number of sector on the track is added to the negative result.

A signal commensurate with the seek length 3 is determined by evaluating the modulus of the difference between the target track number and the present track number.

The target seek time 4 is determine in the following manner from the available seek time 2, the seek length 3 and the voice coil temperature. A value commensurate with the least possible time it would take to move between those tracks is determined by means of a look up table of predetermined values using the calculated seek length. This is the so called flat out time.. In practice the prior art devices would carry out the movement in a time greater than this flat out time in order to take account of unmodeled effects such as heating. Next, the target seek time 4 is set equal to the available seek time 2. The target seek time 4 is then compared with the flat out time and if it is less than the flat out time then it is increased by amounts corresponding to the time of rotation of the data storage medium until the target seek time 4 is greater than the flat out time. At this point the target seek time 4 will have a value which should result in the data head arriving at the portion to be accessed just in time to access that portion and with a total access time not longer than in the prior art devices which are driven at the maximum possible speed and arrive at the target track before the portion to be accessed has rotated to beneath the data head.

FIG. 2 illustrates how the temperature of the voice coil motor is monitored. The current through the voice coil motor is sampled and the heat dissipated in the coil can be calculated as proportional to the square of this current multiplied by the coil resistance. The coil resistance will vary with temperature but if desired this second order effect can be ignored. At the same time the amount of heat lost from the coil of the previous cycle can be determined as proportional to the difference in temperature between the coil and its surroundings divided by the thermal resistance between the coil and its surroundings. Once the change in the heat content of the coil in that period has been found the change in temperature this will produce can be determined as the change in heat content divided by the thermal capacity of the coil. The value of the coil temperature 1 can then be updated.

Once the target seek time has been determined as described with reference to FIG. 1 then a check is made to see if the coil temperature 1 is such that to drive it to carry out the movement in the target time would overheat the coil. Varying levels of sophistication are possible but a calculation having the form outlined above can be used to determine what temperature the coil 1 would reach if so driven. If the temperature the coil 1 would reach exceeds a predetermined safe level then the target seek time 4 is increased by amounts equal to the period of one revolution of the data storage medium and the check repeated until a target seek time 4 at which it is safe to drive the coil is reached. It can thus be seen how this method of control monitors the coil temperature 1 and increases the movement time if a predetermined temperature is exceeded.

FIG. 3 illustrates the control of the start of the seek movement before the mechanism enters the coast phase 10. During the phase illustrated in this figure the mechanism is being accelerated. The information required to carry out this control is the target seek time established as described with reference to FIG. 1, the elapsed seek time which is timed by the controller, the target track and the present track which will be available as described previously, and the present velocity which could be monitored as the rate of crossing tracks. The control steps are carried out once per sector sensed passing beneath the data head.

The present velocity is used to index look up tables which yield the time it will take to decelerate from the present velocity (decelerate time 5) and the distance that will be covered whilst decelerating from the present velocity (decelerate distance 6). The time available for the coast phase 7 determined by subtracting the elapsed seek time and the decelerate time from the target seek time. The distance to be covered in the coast phase 8 is found by subtracting the decelerate distance from the modulus of the difference between the target track and the present track. The coast velocity 9 that would be required given the present state of the device is calculated by dividing the coast distance by the coast time. This calculated coast velocity 9 is then compared with the present velocity and if the mechanism has attained the required coast velocity 9 then the device will enter the coast phase 10. The rest of the movement may be controlled in a number of possible ways such as that described in European Patent No. 13326.

FIG. 4 shows the major hardware components of the disk drive of the present invention. Rotating disk storage medium 41 is rotated by disk motor 42. Data recorded on the surface of of disk 41 is accessed by head 43 mounted on voice coil actuator 44. Voice coil 45 moves voice coil actuator 44 to position head 43 at an appropriate radial position on disk 41. Controller 46 drives voice coil 45 and receives data from head 43. In one embodiment, thermal sensor 47 senses temperature near voice coil 45.

What is claimed is:

1. A data storage apparatus comprising:
   a rotating storage medium;
   means for rotating said rotating storage medium;
   a data head which passes over said rotating storage medium;
   means for moving the data head to various positions over the rotating storage medium, said means capable of moving the data head between a first radial position on the rotating storage medium and a second radial position on the rotating storage medium in a selected minimum time;
   a data target at said second radial position having varying circumferential position; and
   a controller for controlling movement of the data head, the controller further comprising: (a) means for ascertaining the circumferential position of said data target, and (b) means for varying the time taken to move the data head between said first radial position and said second radial position, said means for varying the time taken to move the data head including means for increasing a target time to move the data head between said first radial position and said second radial position in response to said circumferential position of said data target.

2. The data storage apparatus of claim 1 wherein the means for varying the time taken to move the data head further comprises means to increase the target time by amounts equal to a time for one revolution of the rotating storage medium.

3. The data storage apparatus of claim 1 further comprising means coupled to said controller for detecting a temperature within the data storage apparatus, wherein said means for varying the time includes means for increasing the target time in response to the temperature within the data storage apparatus.

4. The data storage apparatus of claim 1 further comprising means coupled to said controller for detecting a temperature associated with said means for moving the data head, wherein said means for varying the time includes means for increasing the target time in response to the temperature associated with said means for moving the data head.

5. A method for moving a data head in a data storage apparatus having a rotating storage medium from a first radial position to a second radial position on the rotating storage medium, said rotating storage medium having a data target at said second radial position having varying circumferential position, said data storage apparatus having a voice coil through which current is passed to move the data head, said method comprising steps of:
   determining the position of the first radial position over the rotating storage medium;
   determining the position of the second radial position over the rotating storage medium;
   determining the circumferential position of said data target; and
   establishing a target time over which the data head is moved from the first radial position to the second radial position in response to said circumferential position of said data target.

6. The method for moving a data head in a data storage apparatus of claim 5 wherein the step of establishing a target time further comprises the steps of:
   finding a minimum amount of time for moving the data head between the first radial position and the second radial position;
   determining the circumferential position of the data target after the said minimum amount of time; and
   increasing the target time when the circumferential position of the data target is beyond the circumferential position of the data head when said data head is in said second radial position.

7. The method of claim 6 wherein the step of increasing the target time further comprises the step of adding amounts of time equal to a time for one revolution of the rotating storage medium until the target time is greater than the said minimum amount of time for moving the data head between the first radial position and the second radial position.

8. The method of claim 7 further comprising the steps of:

determining what a resulting temperature of the voice coil will be after moving the data head from the first radial position to the second radial position over the target time; and comparing the resulting temperature of the voice coil to a predetermined maximum temperature for the voice coil.

9. The method of claim 8 further comprising the step of increasing the target time when the resulting temperature is greater than the predetermined maximum temperature for the voice coil.

10. The method of claim 9 wherein the step of increasing the target time includes the step of adding amounts of time equal to the time for one revolution of the rotating storage medium until the resulting temperature of the voice coil is less than the predetermined maximum temperature for the voice coil.

11. A data storage apparatus comprising:
a rotating storage medium;
means for rotating said rotating storage medium;
a data head which passes over said rotating storage medium;
means which includes a motor for moving the data head to various positions over the rotating storage medium;
means for estimating a temperature of the motor;
a controller for controlling the means for moving the data head further comprising means for varying a time taken to move the data head between a first position on the rotating storage medium and a second position on the rotating storage medium in response to the estimated motor temperature.

12. A method for controlling an actuator in a data storage apparatus, said actuator having a first end which carries a head for reading data from at least one rotating storage medium in said data storage apparatus and having a second end which includes a portion of a voice coil motor which is used to move the actuator which in turn moves the head at the first end to various positions over the rotating storage medium where representations of data are stored, the voice coil motor including a magnet and a voice coil, said method comprising the steps of:
selecting a predetermined maximum temperature of the voice coil;
measuring a temperature of the voice coil;
estimating a temperature of the voice coil based on the measured temperature and on deliverance of current to the voice coil at a selected level to move the actuator;
comparing the estimated temperature to the predetermined maximum temperature; and
selecting a level of current to deliver to the voice coil to accomplish an actuator movement which will not cause the estimated temperature to exceed said predetermined maximum temperature.

13. A data storage apparatus comprising:
a rotating storage medium;
means for rotating said rotating storage medium;
a data head which passes over said rotating storage medium;
means for moving the data head to various positions over the rotating storage medium, said means capable of moving the data head between a first radial position on the rotating storage medium and a second radial position on the rotating storage medium in a selected minimum time;
wherein said means for moving the data head further comprises a voice coil actuator for moving the data head between the first radial position and the second radial position; and
a controller for controlling movement of the data head, the controller further comprising means for varying the time taken to move the data head between said first radial position and said second radial position, said means for varying the time taken to move the data head including means for increasing a target time to move the data head between the first and second radial positions beyond the selected minimum time when the data at the second radial position will arrive beneath the data head in a time greater than the selected minimum time;
wherein said means for varying the time taken to move the data head between said first radial position and said second radial position further comprises:
means for monitoring a temperature of the voice coil actuator;
means for determining an increase in temperature of the voice coil actuator resulting from various target times; and
means for adding the increase in temperature to the monitored temperature and comparing the resulting temperature to a predetermined temperature, whereby the means for varying the time taken to move the data head will increase the target time until the resulting temperature is less than the predetermined temperature.

14. The data storage apparatus of claim 13 wherein the means for varying the time taken to move the data head increases the target time by amounts equal to a time for one revolution of the rotating storage medium until the resulting temperature is less than the predetermined temperature.

15. The data storage apparatus of claim 13 wherein the means for monitoring the temperature of the voice coil actuator includes a transducer positioned near the data storage apparatus.

16. The data storage apparatus of claim 13 wherein the means for monitoring the temperature of the voice coil actuator includes a transducer positioned on a housing of the data storage apparatus.

17. The data storage apparatus of claim 13 wherein the means for monitoring the temperature of the voice coil actuator includes means for sampling current through a voice coil motor of the voice coil actuator.

18. The data storage apparatus of claim 13 wherein the means for monitoring the temperature of the voice coil actuator includes means for determining the temperature of a voice coil motor of the voice coil actuator from movements of the data head which have been carried out.

* * * * *